(12) United States Patent
Tran et al.

(10) Patent No.: US 7,787,453 B2
(45) Date of Patent: Aug. 31, 2010

(54) NETWORK INTERFACE CONTROLLER WITH RECEIVE SIDE SCALING AND QUALITY OF SERVICE

(75) Inventors: Thanh Tran, Anaheim, CA (US); Andrew Hwang, Redondo Beach, CA (US); Henry Chou, Anaheim, CA (US)

(73) Assignee: Broadcom Corporation, Irvine, CA (US)

( * ) Notice: Subject to any disclaimer, the term of this patent is extended or adjusted under 35 U.S.C. 154(b) by 413 days.

(21) Appl. No.: 11/882,550

(22) Filed: Aug. 2, 2007

(65) Prior Publication Data

US 2008/0034101 A1  Feb. 7, 2008

Related U.S. Application Data

(60) Provisional application No. 60/835,096, filed on Aug. 3, 2006.

(51) Int. Cl.
*H04L 12/28* (2006.01)
(52) U.S. Cl. ...................................... 370/389
(58) Field of Classification Search ....................... None
See application file for complete search history.

(56) References Cited

U.S. PATENT DOCUMENTS

| | | | |
|---|---|---|---|
| 5,517,616 A * | 5/1996 | Taylor | 714/11 |
| 2003/0187914 A1* | 10/2003 | Kaniyar et al. | 709/201 |
| 2005/0238019 A1* | 10/2005 | Vasudevan et al. | 370/389 |
| 2006/0034310 A1* | 2/2006 | Connor | 370/419 |
| 2006/0227788 A1* | 10/2006 | Eldar et al. | 370/395.4 |
| 2007/0006186 A1* | 1/2007 | Johnson et al. | 717/140 |
| 2007/0070904 A1* | 3/2007 | King et al. | 370/235 |
| 2007/0230489 A1* | 10/2007 | Cornett et al. | 370/412 |

OTHER PUBLICATIONS

"Scalable Networking: Eliminating the Receive Processing Bottleneck—Introducing RSS," Windows Hardware and Driver Central, WinHEC 2004 Version, Apr. 14, 2004, pp. 1-17.

* cited by examiner

*Primary Examiner*—Hong Cho
*Assistant Examiner*—Hicham B. Foud
(74) *Attorney, Agent, or Firm*—Sterne, Kessler, Goldstein & Fox P.L.L.C

(57) ABSTRACT

The present invention is directed to methods and systems for scaling receive protocol processing by allowing the network load from a network adapter to be balanced across multiple CPUs based on RSS and/or QoS traffic classification techniques.

10 Claims, 10 Drawing Sheets

| Destination | Source | Length Type | Data Unit + pad | FCS |
|---|---|---|---|---|
| (6 bytes) | (6 bytes) | (2) | (46-1500 bytes) | (4 bytes) |

Ethernet header structure

FIG. 4A

| RSS ENABLE (103) | RSS Valid (111) | RSS Receive Queue # (112) | QoS ENABLE (105) | QoS Valid (121) | QoS Receive Queue # (122) | Resolution Control (106) | Resolved Receive Queue # (131) |
|---|---|---|---|---|---|---|---|
| disabled | don't care | don't care | disabled | don't care | don't care | don't care | default queue # |
| enabled | invalid | don't care | disabled | don't care | don't care | don't care | default queue # |
| enabled | valid | queue x | disabled | don't care | don't care | don't care | queue x |
| disabled | don't care | don't care | enabled | invalid | don't care | don't care | default queue # |
| disabled | don't care | don't care | enabled | valid | queue y | don't care | queue y |
| enabled | invalid | don't care | enabled | invalid | don't care | don't care | default queue # |
| enabled | valid | queue x | enabled | valid | queue y | don't care | queue x |
| enabled | invalid | don't care | enabled | valid | queue y | don't care | queue y |
| enabled | valid | queue x | enabled | valid | queue y | RSS | queue x |
| enabled | valid | queue x | enabled | valid | queue y | QoS | queue y |

NETWORK INTERFACE CONTROLLER WITH RECEIVE SIDE SCALING AND QUALITY OF SERVICE

BACKGROUND OF THE INVENTION

1. Field of the Invention

The invention described herein relates to network interface controllers (NIC). More particularly, the present invention described herein relates to the interaction between NIC and computers with more than one processor.

2. Related Art

Communicating over a NIC typically requires the sending and receiving of packets. As computers become more complex by utilizing a set of microprocessors instead of the standard single microprocessor, issues arise concerning process allocation. In the past all packets communicated through a NIC were handled by one processor regardless of the number of processors that the computer had. New technologies have been developed to deal with this problem. Quality of Service (QoS) and Receive Side Scaling (RSS) are two examples. QoS uses a rules comparator and match arbitration to determine the processor queue to which to send a packet. RSS uses a Toeplitz hash function on the packet header and a look up table to determine the processor queue to which to send a packet.

What is needed is a method and system to simultaneously determine the processor queue identified by an RSS engine and the queue identified by a QoS engine, and subsequent means for determining which of those two queues to use, based on a resolution scheme.

SUMMARY OF THE INVENTION

The present invention is directed to methods and systems for scaling receive protocol processing by allowing the network load from a network adapter to be balanced across multiple CPUs based on RSS and/or QoS traffic classification techniques.

In an embodiment, a network interface controller (NIC) is adapted to deliver data input to a central processing unit (CPU) in a multi-CPU computer system. The NIC receives data input and parses a portion of the data input. First, the NIC applies a function to the portion of the data input to generate a first CPU queue identifier and a first valid signal. Second, the NIC applies user defined rules to the portion of the data input to generate a second CPU queue identifier and a second valid signal. The NIC generates a global CPU queue identifier based on the two CPU queue identifiers and the two valid signals and routes the data packet to the CPU defined by the global CPU queue identifier.

In another embodiment, a NIC has a receive side scaling (RSS) engine, a quality of service (QoS) engine, and a resolution logic module. The RSS engine receives a plurality of inputs and produces an RSS CPU queue identifier and a first valid signal. The QoS engine receives a plurality of inputs and produces a QoS CPU queue identifier and a second valid signal. The resolution logic module receives the RSS CPU queue identifier, the QoS CPU queue identifier and their valid signals and produces an output CPU queue identifier.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

FIGS. 4A-4E illustrate various header structures according to embodiments of the invention.

FIG. 5 is a resolution scheme table according to an embodiment of the invention.

DETAILED DESCRIPTION OF THE INVENTION

Figure 1:
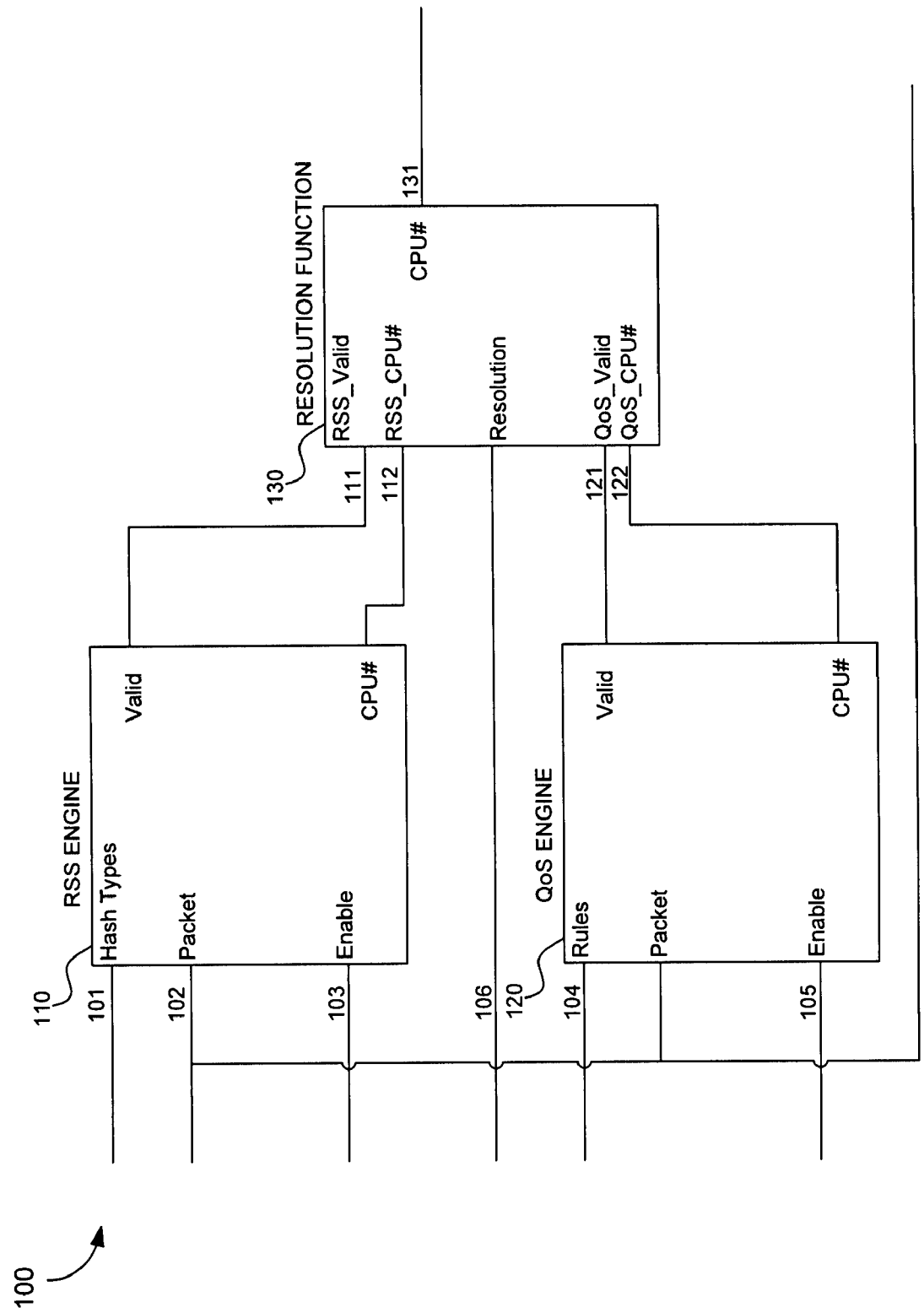
FIG. 1 is a block diagram illustrating an embodiment of the invention.

The present invention is directed to methods and systems for scaling receive protocol processing by allowing the network load from a network adapter to be balanced across multiple CPUs based on RSS and/or QoS traffic classification techniques. An embodiment of the claimed invention is shown in FIG. 1. FIG. 1 shows RSS engine 110, QoS engine 120 and a resolution function implemented as logic 130. Software controlled RSS and QoS enable bits are shown as 103 and 105 respectively. Software controlled hash types and rules are show as 101 and 104 respectively. An Ethernet packet header enters the system on the packet line 102. RSS engine 110 produces valid bit 111 and a CPU queue identifier, e.g., a queue number, shown as value 112. Similarly, QoS engine 120 produces valid bit 121 and CPU queue identifier, e.g., a queue number, shown as value 122. In an embodiment, CPU queue identifiers 112, 122 are generated simultaneously or in parallel. Resolution logic 130 takes both valid bits (111, 121), both CPU queue identifiers (112, 122) and software controlled resolution bit 106 and produces global CPU queue identifier 131.

Figure 2:
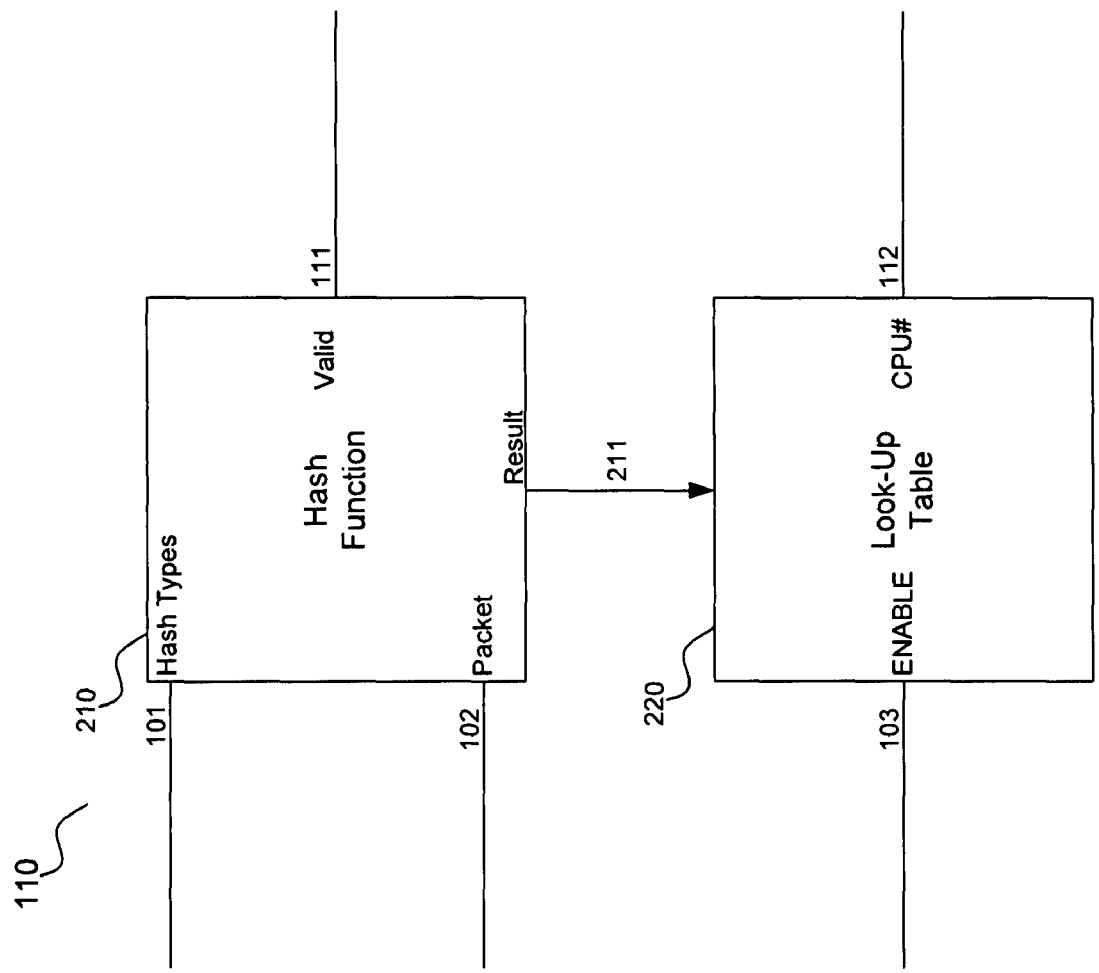
FIG. 2 illustrates an RSS Engine according to an embodiment of the invention.

FIG. 2 shows RSS engine 110 according to an embodiment of the claimed invention. In an embodiment, hash function 210 may perform a Toeplitz hash function on a header of a packet received on line 102 according to software controlled hash types 101 and produce result 211 as well as valid bit 111. In the embodiment shown, valid bit 111 is a hash valid bit. In an embodiment of the invention, RSS engine 110 extracts IP addresses and/or TCP port numbers from an incoming packet, such as an Ethernet packet, and uses them to perform a Toeplitz hash. Result 211 of the Toeplitz hash is used as an index to look-up table 220. Look-up table 220 contains CPU receive queue numbers corresponding to hash results. Result 211 is therefore dependent on the hash output. Look-up table 220 takes result 211 and outputs CPU queue identifier 112 if enable bit 103 is set.

Figure 3:
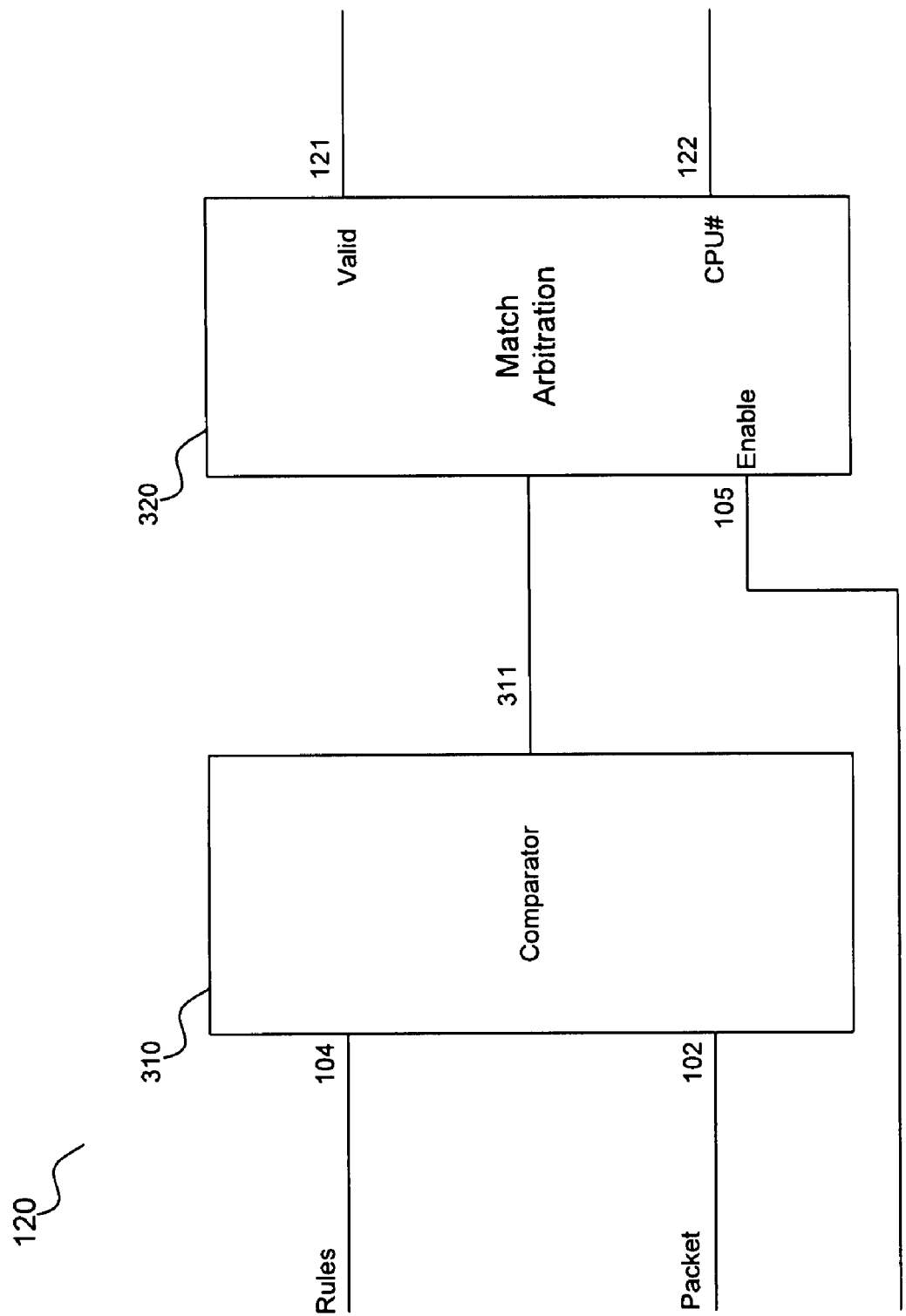
FIG. 3 illustrates a QoS Engine according to an embodiment of the invention.

FIG. 3 shows QoS engine 120 according to an embodiment of the claimed invention. Generally, QoS engine 120 can be implemented as a hardware block that operates on multiple sets of user programmable rules and incoming Ethernet packets. A set of user programmable rules consist of a CPU receive queue number and rules that identify the types of receive packets to be directed to that CPU receive queue. User programmable rules are used to identify the types of packets by using pattern matching (= or !=) or pattern comparison (> or <) logic. Typical usage is to do pattern matching or comparison on the "Type of Service" field in IPv4 header, "Priority" field in IPv6 header, "User Priority" field in VLAN header, or "Length/Type" field in an Ethernet header.

In the implementation of FIG. 3, comparator 310 therefore performs a compare operation, as described above, on a header of a packet received on line 102 according to software controlled rule(s) 104 and produces result 311. Match arbitration logic 320 takes result 311 and outputs CPU queue identifier 122 (if enable bit 105 is set) as well as QoS valid bit 121. In an alternative embodiment of the invention, rule(s) 104 can be preprogrammed in QoS engine 120 instead of being input to this engine on an input line.

As described above with respect to FIG. 1, resolution logic 130 takes both valid bits (111, 121), both CPU queue identifiers (112, 122) and software controlled resolution bit 106 and produces global CPU queue identifier 131. From a system point of view, RSS is used to distribute receive packets evenly for CPU load balancing. QoS is used to filter certain types of application packets to a dedicated processor for system performance improvement and increased security. Using both RSS and QoS simultaneously would give users the benefits of both features.

One example of RSS and QoS operating simultaneously is in a 4-way CPU system where CPU 1 is dedicated for real-time VoIP (Voice over IP) and video decoding, while CPU 2, CPU 3 and CPU 4 are used for general purpose processing. In this example, RSS would utilize CPU 2, CPU 3 and CPU 4, and QoS would utilize CPU 1. If QoS is not enabled, then there is no guarantee that CPU 1 would only receive VoIP and video related packets. Furthermore there is no guarantee VoIP and video related packets would not be placed at CPU 2, CPU 3 and CPU 4. This means that VoIP and video related packets received in CPU 2, CPU 3, and CPU 4 would have to be forwarded to CPU 1, which would increase inter-CPU communication and reduce overall system performance.

Another example of RSS and QoS operating simultaneously is in a 3-way CPU system where CPU 3 is dedicated for running secure VPN (Virtual Private Network) applications using IPsec and CPU 1 and CPU 2 are used for general purpose processing. In this example, if CPU 1 or CPU 2 were under network attack CPU 3 would not be affected. This improves the overall system security.

Figure 4B:
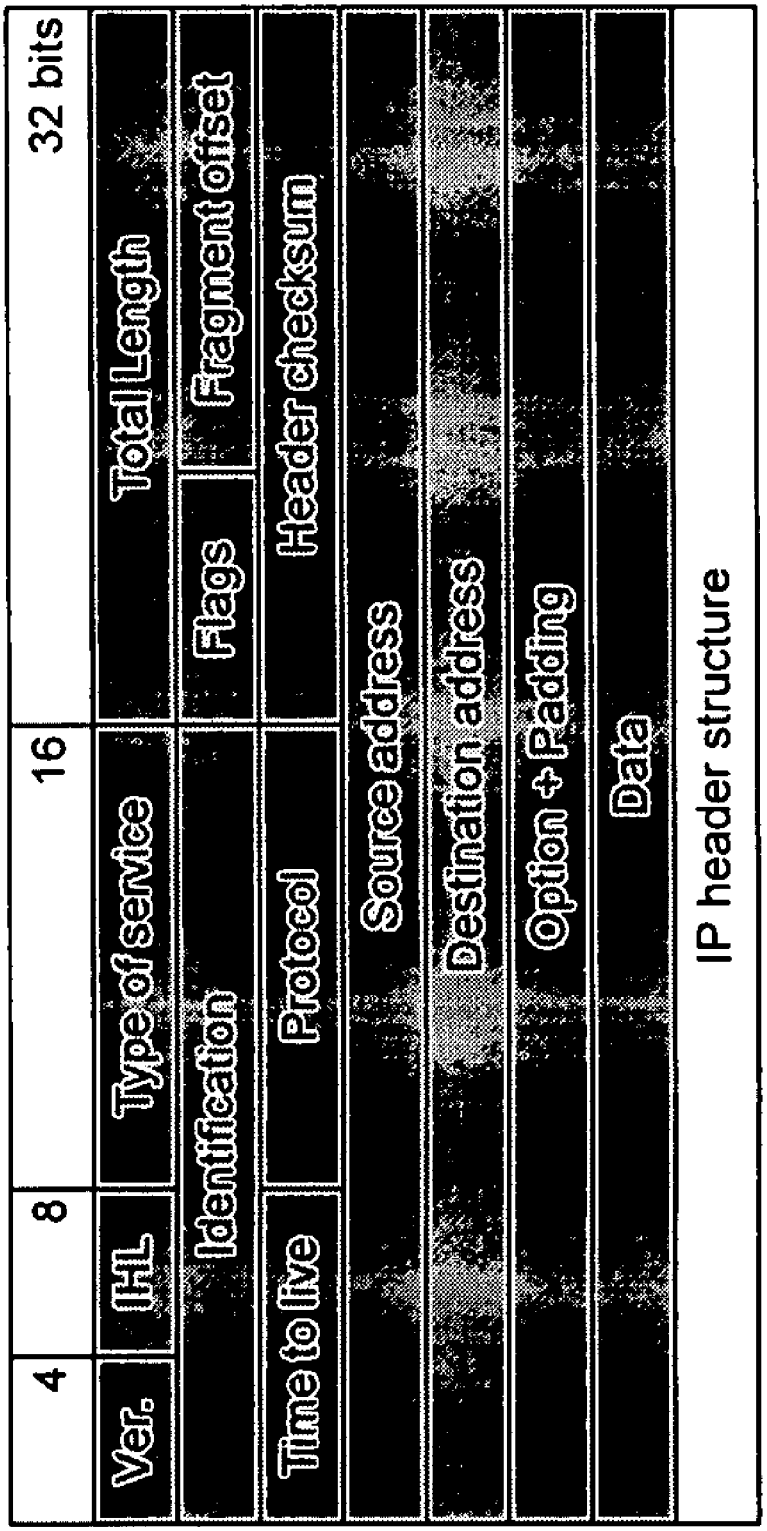
Figure 4C:
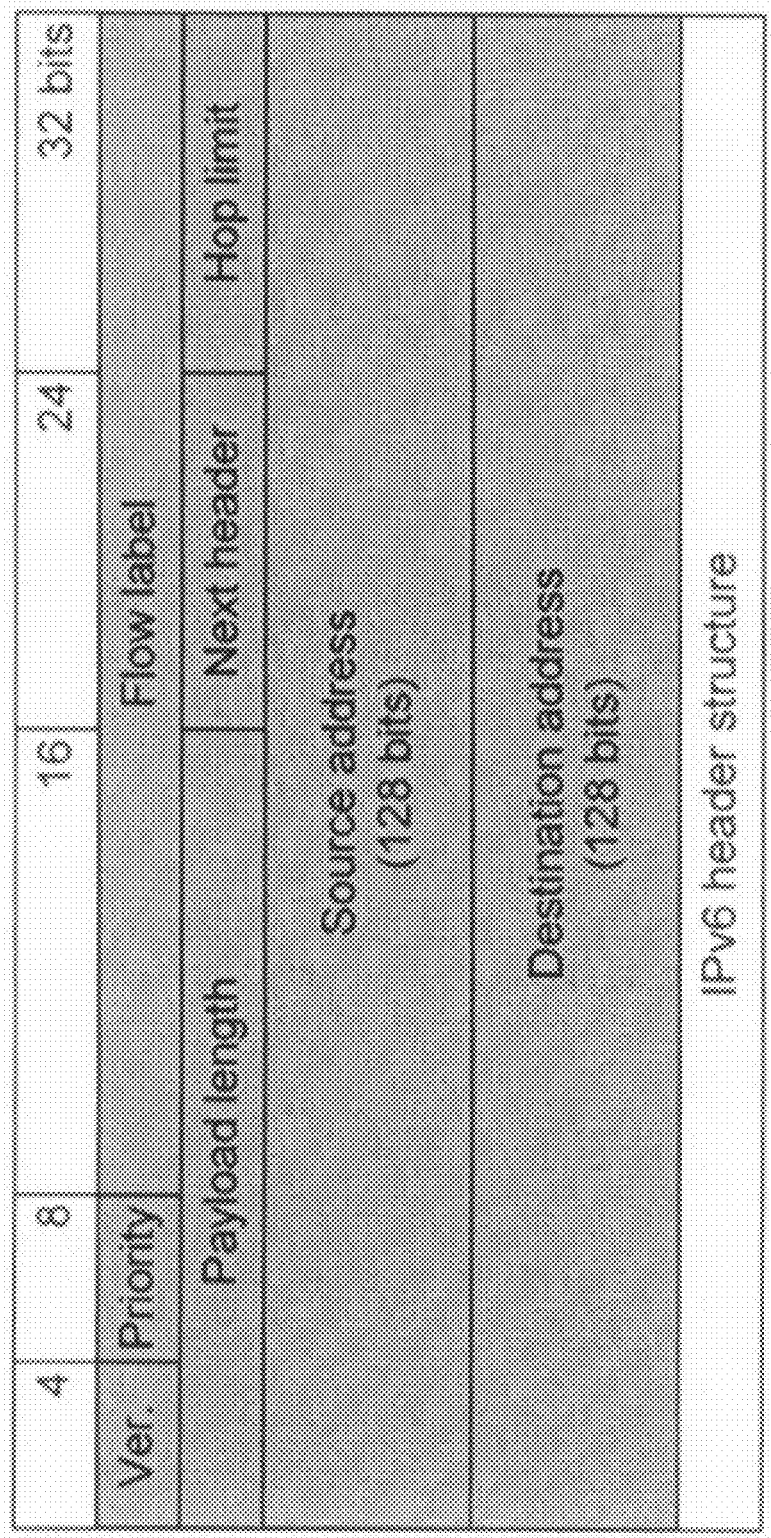
Figure 4D:
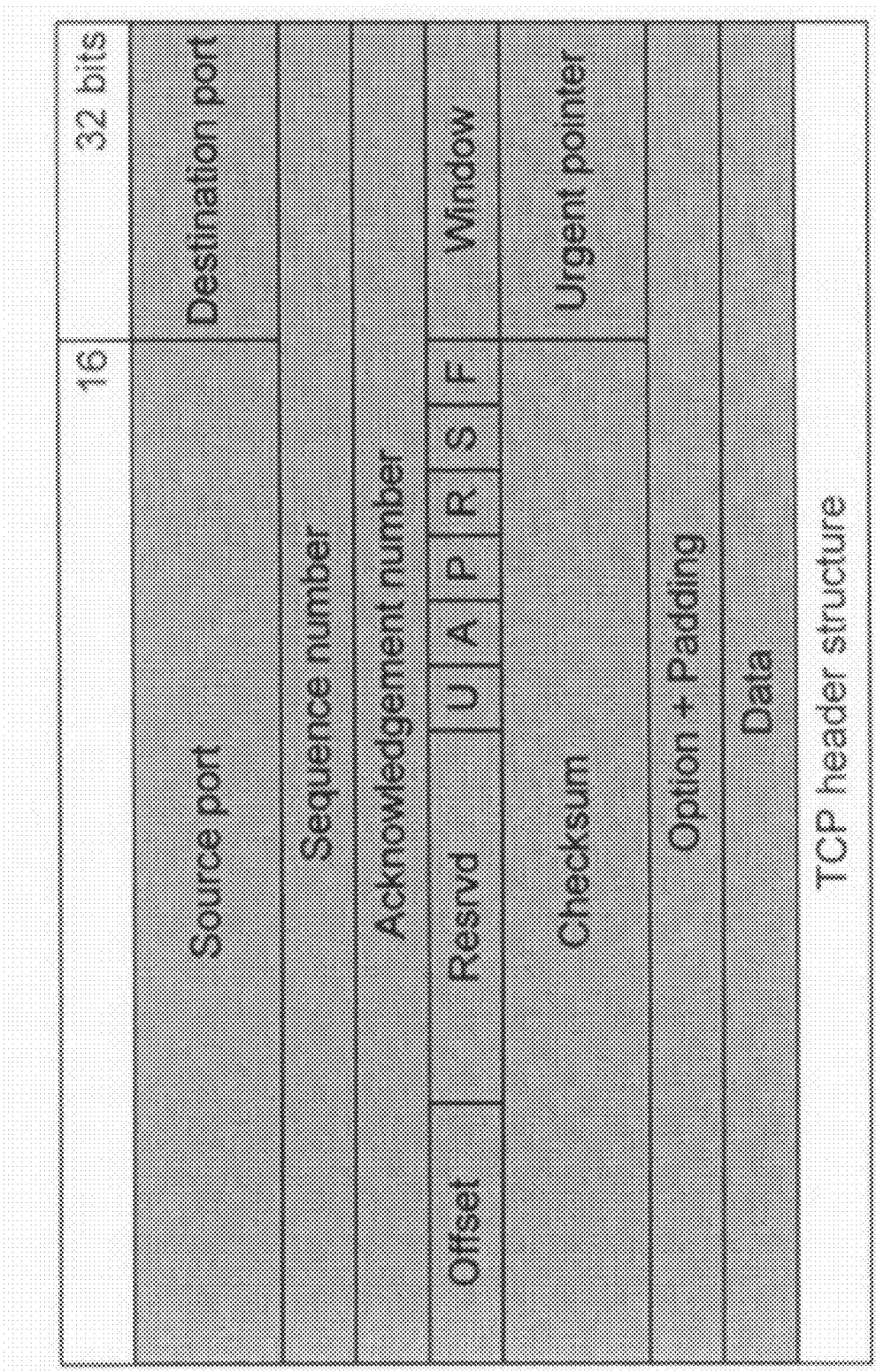
Figure 4E:
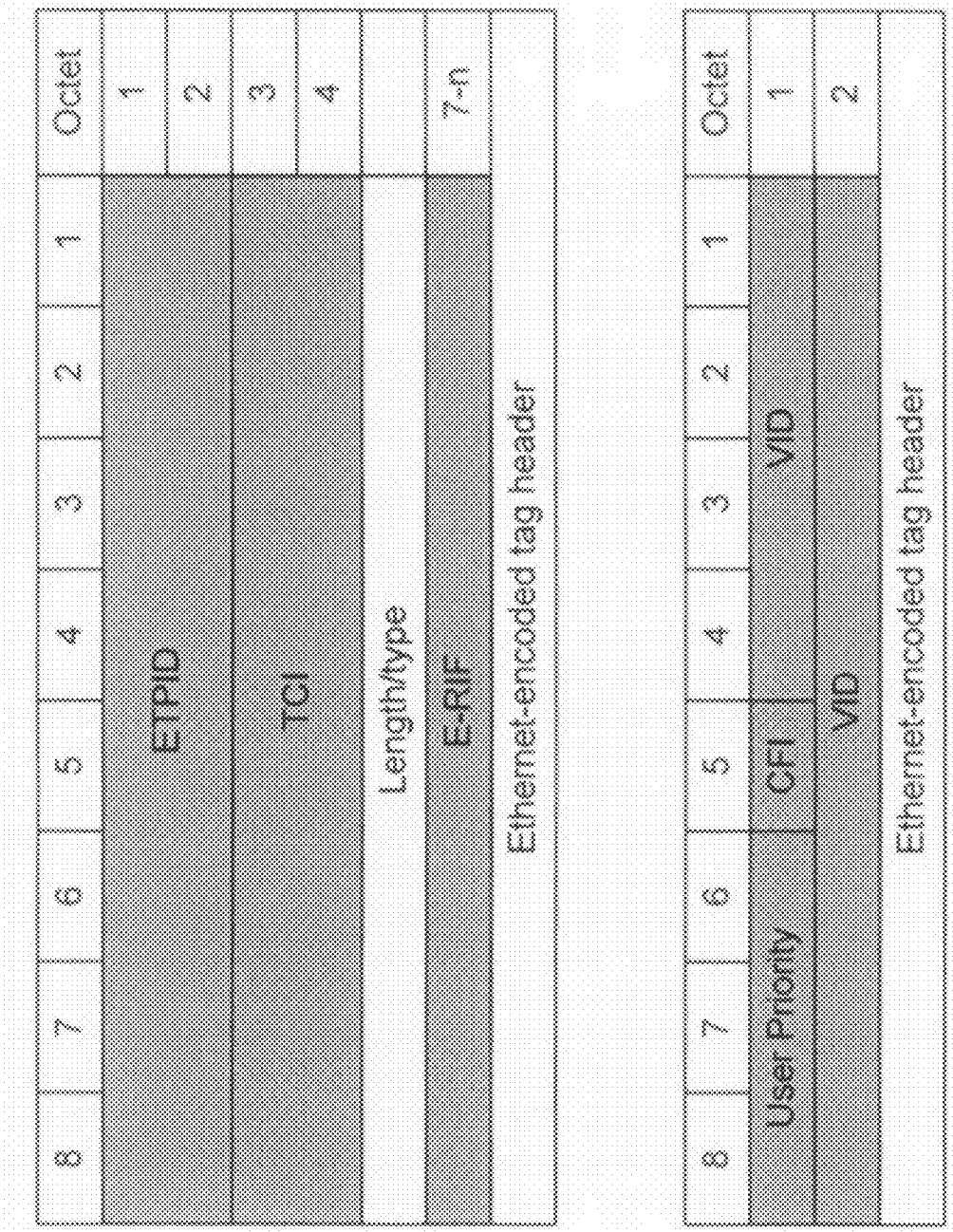

FIGS. 4A-4E show example packet headers according to various standards, as they might appear at line 102 according to an embodiment of the invention. FIG. 4A shows an Ethernet packet header. FIG. 4B shows an IP (IPv4) header. FIG. 4C shows an IPv6 header. FIG. 4D shows a TCP header structure. FIG. 4E shows an Ethernet-encoded tag header that would be used in a VLAN context. As described above, source and destination portions of these headers may be used by RSS engine 110. Similarly the QoS engine, previously described, may use the "Type of Service" field in the IPv4 header, "Priority" field in the IPv6 header, "User Priority" field in the VLAN header, and "Length/Type" field in the Ethernet header.

FIG. 5 shows a table of an example resolution scheme as implemented in resolution logic 130, according to an embodiment of the invention. The table shows how the intermediate signals 111, 112, 121 and 122 and the global CPU queue identifier 131 would be set if the input signals 103, 105, and 106 were in the states listed. If RSS enable 103 is disabled, RSS valid 111 and RSS Receive Queue # (RSS_CPU #) 112 are inconsequential and labeled "don't care." Similarly, if QoS enable 105 is disabled, QoS valid 121 and QoS Receive Queue # (QoS_CPU #) 122 are likewise inconsequential and labeled "don't care." In an embodiment, a "don't care" signal 106 is sent to the resolution control. In another embodiment, resolution control 130 may directly use RSS enable 103 and QoS enable 105 to filter out "don't care" results.

Figure 6:
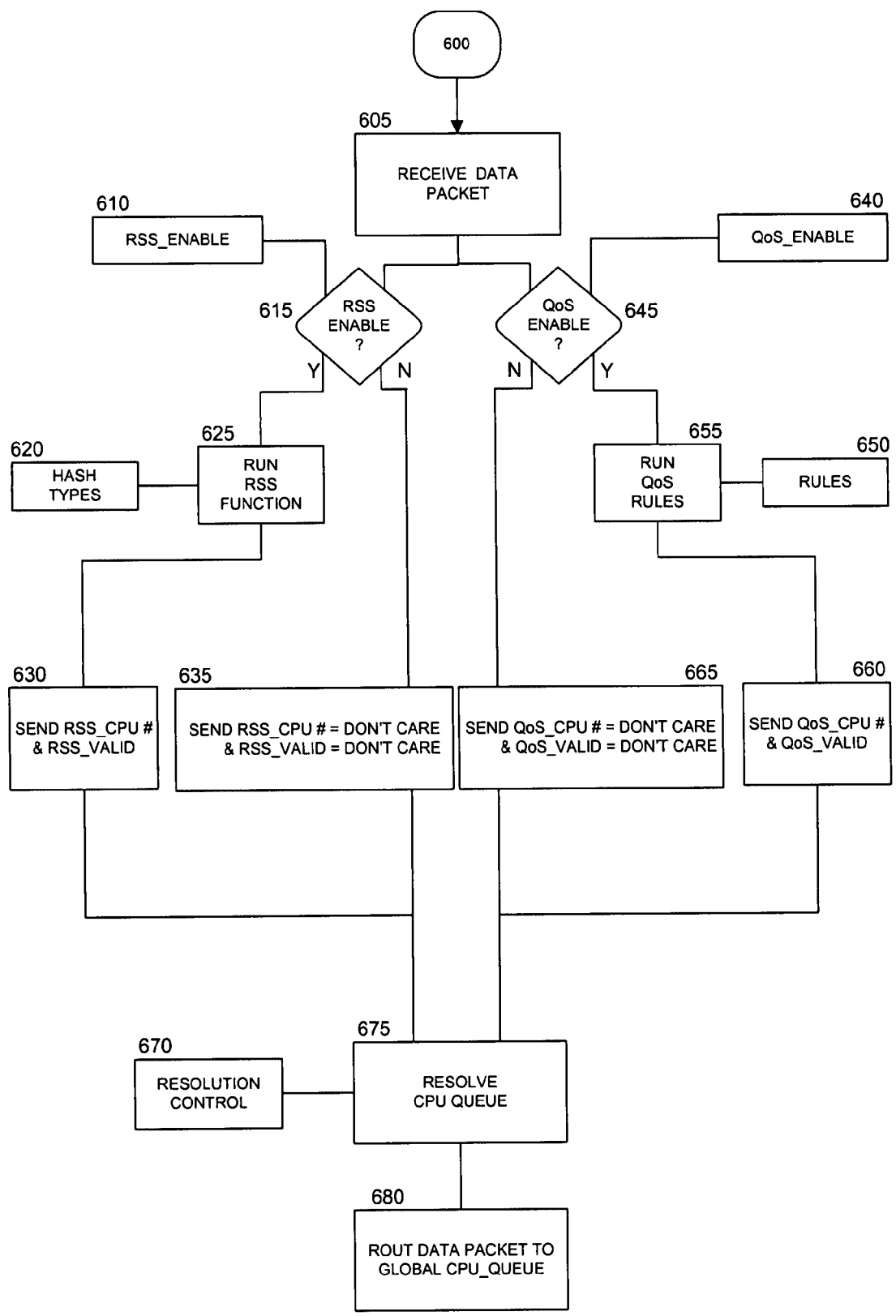
FIG. 6 is a flow diagram according to an embodiment of the present invention.

In a further embodiment, FIG. 6 shows a flow diagram directed to a method according to the present invention. For brevity, method 600 is described with reference to system 100 but is not necessarily intended to be limited to the structure of system 100. When a data packet is received (step 605), it may be routed to both RSS engine 110 and QoS engine 120. At step 615, if RSS_Enable 610 is asserted, RSS engine 110 may run RSS function (step 625) based on hash types 620 and send RSS_CPU # (RSS CPU queue identifier) and RSS_Valid to resolution function 130 (step 630). Alternatively, if RSS_Enable 610 is not asserted, RSS engine 110 may send "don't care" signals to resolution function 130 in step 635. At step 645, if QoS_Enable 640 is asserted, QoS engine 120 may run QoS rules (step 655) based on rules 650 and send QoS_CPU # (QoS CPU queue identifier) and QoS_Valid to resolution function 130 (step 660). Alternatively, if QoS_Enable 640 is not asserted, QoS engine 120 may send "don't care" signals to resolution function 130 in step 665. Next, in step 675 resolution function 130 resolves a CPU queue based on the inputs from steps 630, 635, 660, and 665 as well as resolution control 670. Finally, the data packet is routed to a CPU based on resolution function 130 (step 680). In another embodiment, method 600 may be performed in a pipelined fashion.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for delivering data input to a central processing unit (CPU) in a multi-CPU computer system, the method comprising:
    (a) receiving a data packet and a resolution control signal;
    (b) parsing a portion of the data packet comprising:
        (i) applying a function to the portion of the data packet to generate a first CPU queue identifier and a first valid signal; and
        (ii) applying user defined rules to the portion of the data packet to generate a second CPU queue identifier and a second valid signal;

(c) generating a global CPU queue identifier based on the first and second CPU queue identifiers, first and second valid signals, and the resolution control signal; and (d) routing the data packet to a CPU defined by the global CPU queue identifier.

2. The method of claim 1, wherein the first CPU queue identifier and first valid signal are generated in parallel with the second CPU queue identifier and second valid signal.

3. The method of claim 1, wherein step (b)(i) further comprises applying a Receive Side Scaling (RSS) function to the portion of the data packet to generate a RSS CPU queue identifier and a RSS valid signal.

4. The method of claim 1, wherein step (b)(ii) further comprises applying Quality of Service (QoS) rules to the portion of the data packet to generate a QoS CPU queue identifier and a QoS valid signal.

5. The method of claim 1, wherein the receiving step further comprises:

(i) receiving a first enable signal; and
(ii) receiving a second enable signal;
wherein the parsing step is controlled by the first and second enable signals.

6. A network interface controller system, comprising:

a receive side scaling (RSS) engine wherein the RSS engine receives a plurality of data packets and produces an RSS CPU queue identifier and a first valid signal;

a quality of service (QoS) engine wherein the QoS engine receives a plurality of inputs and produces a QoS CPU queue identifier and a second valid signal; and a resolution logic module coupled to both the RSS engine and the QoS engine, wherein the resolution logic module receives the RSS CPU queue identifier, the QoS CPU queue identifier, the first and second valid signals, and a resolution control signal, and produces an output CPU queue identifier that identifies a CPU to receive at least a portion of the plurality of data packets.

7. The network interface controller system of claim 6, wherein the RSS engine comprises hash logic.

8. The network interface controller system of claim 6, further comprising user input means for providing rules to the QoS engine.

9. The network interface controller system of claim 6, further comprising user input means for enabling one or more of the RSS engine and QoS engine and means for receiving the resolution control signal.

10. The network interface controller system of claim 6, wherein the data packets each comprise data packet headers and data, wherein the data packet headers are formatted according to one or more of the TCP, IPv4, IPv6, Ethernet and Ethernet LAN standards.

* * * * *